United States Patent [19]

Hashimoto et al.

[11] Patent Number: 4,595,998
[45] Date of Patent: Jun. 17, 1986

[54] ELECTRONIC TRANSLATOR WHICH ACCESSES THE MEMORY IN EITHER A FORWARD OR REVERSE SEQUENCE

[75] Inventors: Shintaro Hashimoto, Ikoma; Masafumi Morimoto, Yamatokoriyama; Kunio Yoshida, Nara; Hisao Morinaga, Nara; Tosaku Nakanishi, Nara; Shigenobu Yanagiuchi, Tenri, all of Japan

[73] Assignee: Sharp Kabushiki Kaisha, Osaka, Japan

[21] Appl. No.: 671,820

[22] Filed: Nov. 16, 1984

Related U.S. Application Data

[63] Continuation of Ser. No. 282,935, Jul. 13, 1981, abandoned.

[30] Foreign Application Priority Data

Jul. 23, 1980 [JP] Japan .................................. 55-102995

[51] Int. Cl.[4] .............................................. G06F 15/38
[52] U.S. Cl. ................................................... 364/900
[58] Field of Search ... 364/200 MS File, 900 MS File, 364/419

[56] References Cited

U.S. PATENT DOCUMENTS

| | | | |
|---|---|---|---|
| 3,781,814 | 12/1973 | Deerfield ............................ | 364/200 |
| 4,090,247 | 5/1978 | Martin ................................. | 364/900 |
| 4,159,536 | 6/1979 | Kehoe et al. ...................... | 364/900 |
| 4,193,119 | 3/1980 | Arase et al. ....................... | 364/900 |
| 4,367,537 | 1/1983 | Yoshida .............................. | 364/900 |
| 4,380,053 | 4/1983 | Takahashi ......................... | 364/900 |
| 4,417,319 | 11/1983 | Morimoto et al. ................. | 364/900 |
| 4,420,816 | 12/1983 | Yoshida .............................. | 364/900 |
| 4,438,505 | 3/1984 | Yanagiuchi et al. .............. | 364/900 |
| 4,468,756 | 8/1984 | Chan ................................... | 364/900 |

FOREIGN PATENT DOCUMENTS

2014765 8/1979 United Kingdom ................ 364/900

Primary Examiner—Gareth D. Shaw
Assistant Examiner—Daniel K. Dorsey
Attorney, Agent, or Firm—Birch, Stewart, Kolasch & Birch

[57] ABSTRACT

An electronic translator has the capability of controlling an access circuit so as to retrieve words or sentences stored in a memory in a forward direction or a backward direction, in order that an access time to the words or sentences is reduced.

5 Claims, 10 Drawing Figures

ELECTRONIC TRANSLATOR WHICH ACCESSES THE MEMORY IN EITHER A FORWARD OR REVERSE SEQUENCE

This application is a continuation, divisional, of application Ser. No. 282,935 filed on July 13, 1981, now abandoned.

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional type electronic devices in that the former is of a unique structure which provides for efficient and rapid retrieval of word information stored in a memory.

In such a translator, rapid retrieval of any word or sentence is assured by a very short access time to a memory for storing a great number of words or sentences. Therefore, it is highly desired to provide as short an access time as possible.

SUMMARY OF THE INVENTION

Accordingly, it is an object of the present invention to provide an improved electronic translator having the capability of very short access time to a memory having a great number of words or sentences stored therein.

It is another object of the present invention to provide an improved electronic translator for retrieving any word or sentence from a memory having a great number of words or sentences, stored therein the retrieval of the memorized information being enabled by reviewing the information alternatively in a forward or a backward direction.

Briefly described, in accordance with the present invention, an electronic translator is characterized by having capability of controlling an access circuit so as to retrieve words or sentences stored in a memory by reviewing the memory in a forward direction or a backward direction, in order that an access time to the words or sentences becomes very short.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

First of all, any kind of languages may be applied to the electronic translator of the present invention. An input word is spelled in a specific language to obtain an equivalent word, or a translated word spelled in a different language corresponding thereto. The types of the languages may be freely selected.

Figure 1:
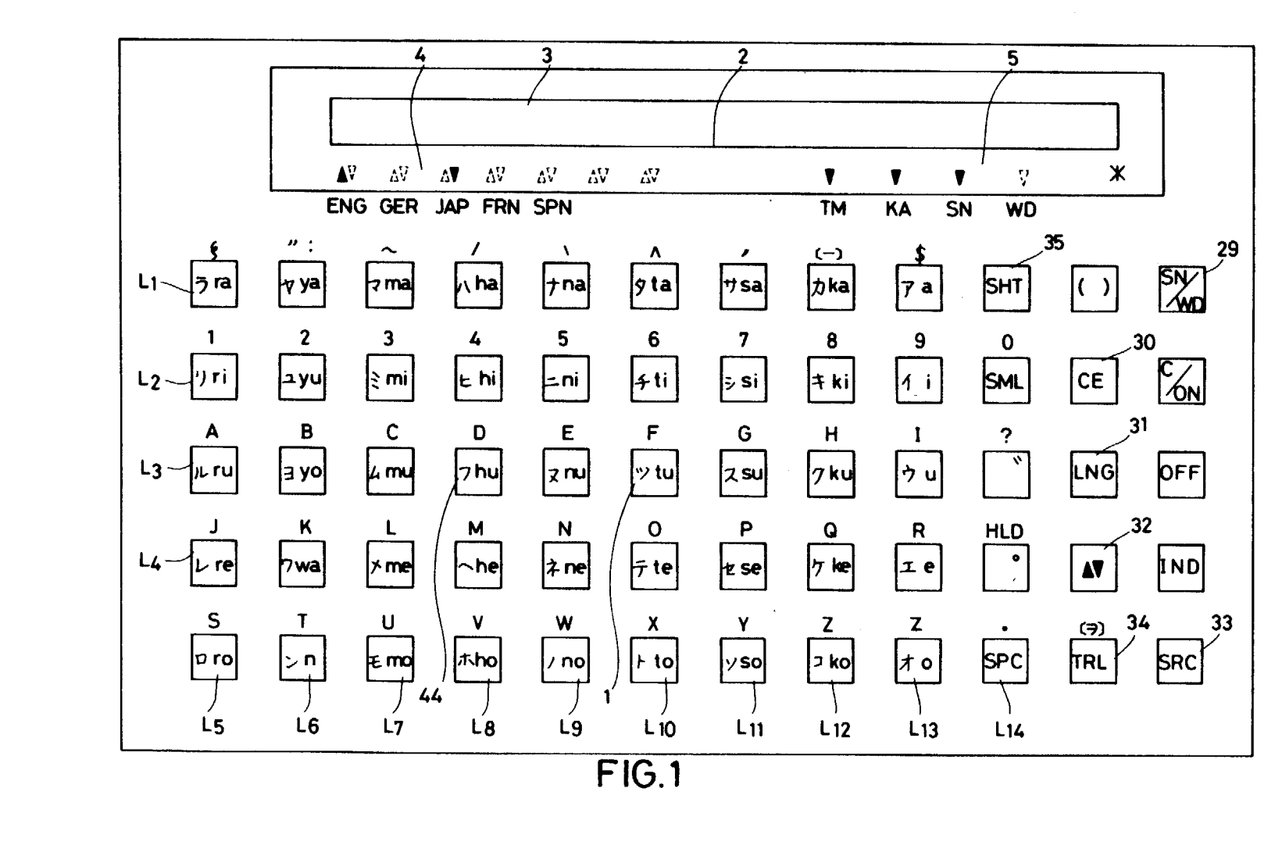
FIG. 1 shows a plan view of an electronic translator according to the present invention.

Referring now to FIG. 1, there is illustrated an electronic translator according to the present invention. The translator comprises a keyboard 1 containing a Japanese syllabery key-board, an alphabetical keyboard, a symbol keyboard, and a functional keyboard, an indicator 2 including a character indicator 3, a kind of tongue indicator 4 and a symbol indicator 5.

Figure 2:
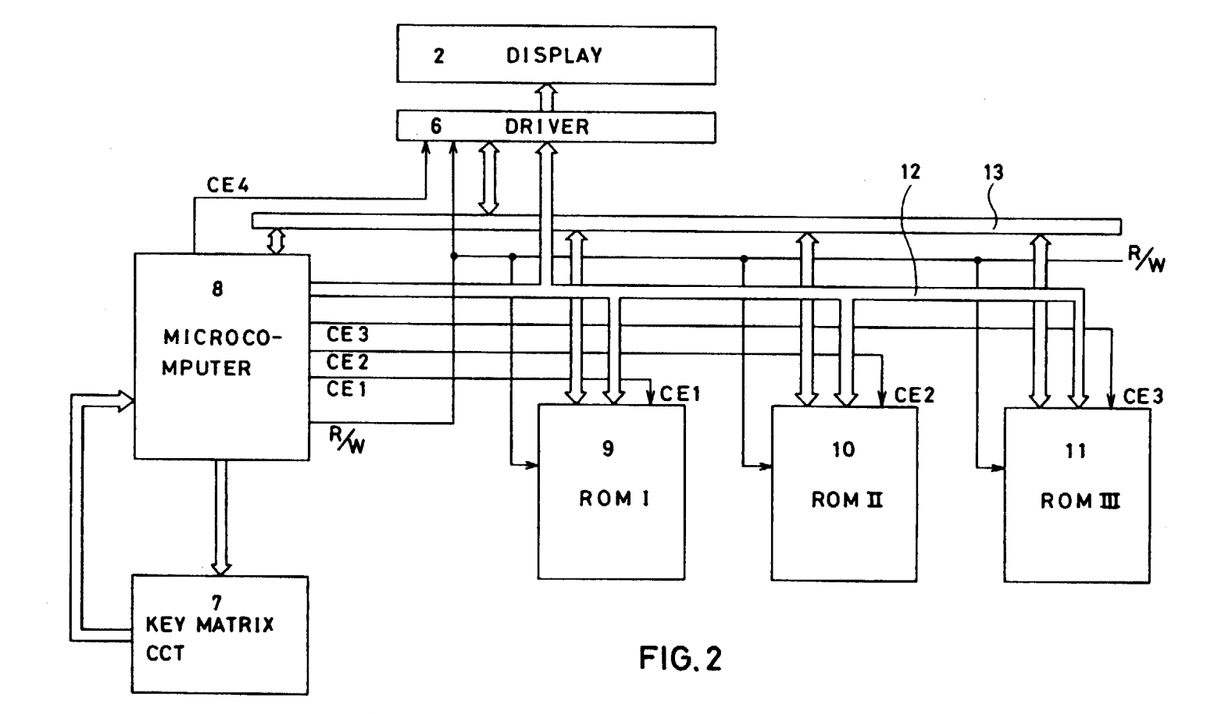
FIGS. 2 and 3 show block diagrams of a control circuit implemented within the translator as shown in FIG. 1.

The character indicator 3 shows characters processed by this translator. The kind of tongue indicator 4 shows symbols used for representing the kind of the mother tongue or language and the foreign tongue or language being processed by the translator. The symbol indicator 5 shows symbols used for indicating operated conditions in this translator. FIG. 2 shows a block diagram of a control circuit implemented in the translator. The circuit comprises the indicator or display 2, a driver 6, a key matrix circuit 7, a microcomputer 8, a ROM I 9, a ROM II 10, and ROM III 11. The key matrix circuit 7 includes the keyboard 1 of FIG. 1. The key matrix circuit 7 is connected to terminals of the microcomputer 8 for developing key strobe signals and key input signals. Each of the ROMs 9 to 11 contains words and/or sentences used by the translator.

According to a preferable example of the present invention, one of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator for exchange purposes. However, each of the ROM II 10 and the ROM III 11 can be removed from the translator and replaced by another type of ROM module 1 or 2.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting a read or write operation.

Figure 3:
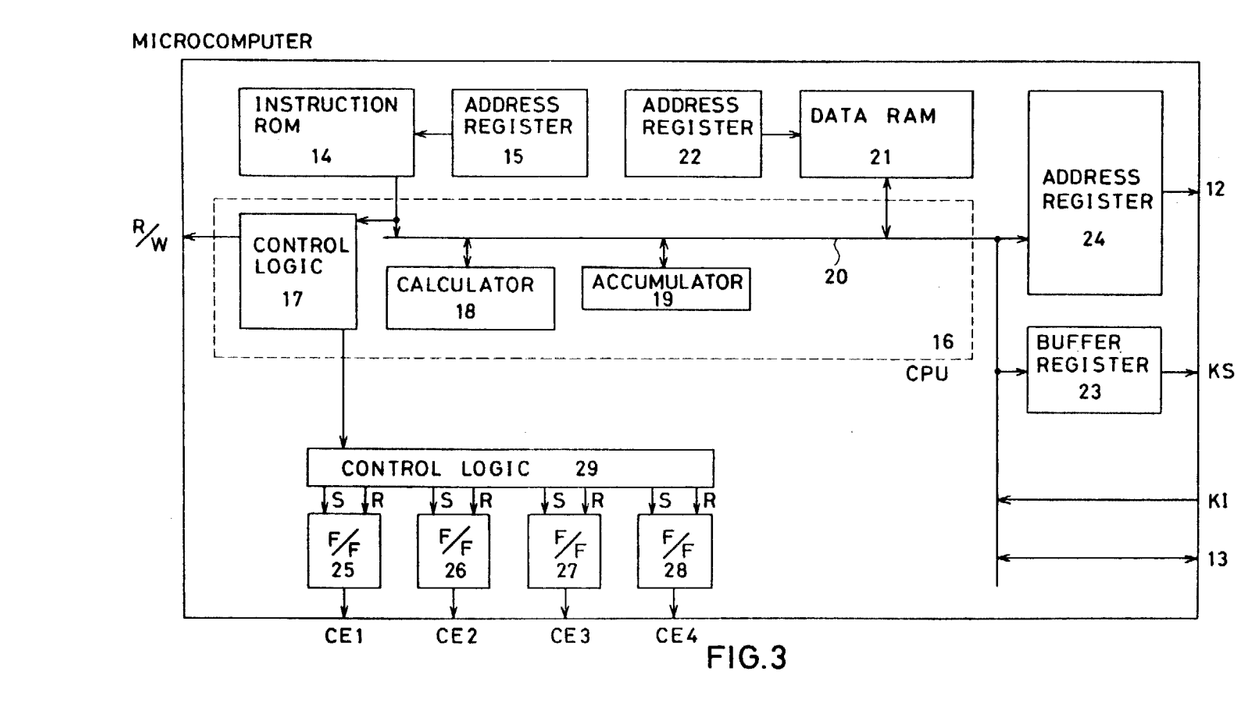

FIG. 3 shows a block diagram of the microcomputer 8 of FIG. 2. An instruction ROM 14 stores a number of kinds of instruction each of which is used for a specific operation by the translator and is, preferably, in coded format. As the address of a ROM address register 15 is in turn advanced, the ROM 14 provides a specific kind of instruction. The specific instruction is applied to a CPU 16, the CPU 16 understanding the instruction to implement selected operation.

The CPU 16 comprises control logic 17, a logic calculator 18, and an accumulator 19. An inner data bus is indicated by numeral 20. A data RAM 21 is provided for preliminarily containing data used for the translator and for functioning as a conditional flip flop used for a branch in a program operation. Data from the CPU 16 is stored in a specific location of the data RAM 21 which is selected by a RAM address register 22. The data stored in such a location in the RAM 21 is developed by the CPU 16.

Numeral 23 represents an output buffer register for outputting key strobe signals KS entered into the key matrix circuit 7 so that the output of this circuit 7 may be applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to selectively increment or decrement its contents or to locate a certain address is carried out by the CPU 16. Since the CPU 16 is coupled to the data bus 13 as shown in FIG. 2, transmission of the data between the CPU 16 and the external memory utilizes the data bus 13. The direction of transmission of the data between them is defined with the read write signal R/W.

Each of flip flop circuits 25 to 28 is set or reset by a control logic circuit 29. The control logic 29 is controlled by the CPU 16. Each of the flip flops 25 to 28 produce an output which is referred to as one of the chip selection signals $CE_1$ to $CE_4$.

Figure 4:
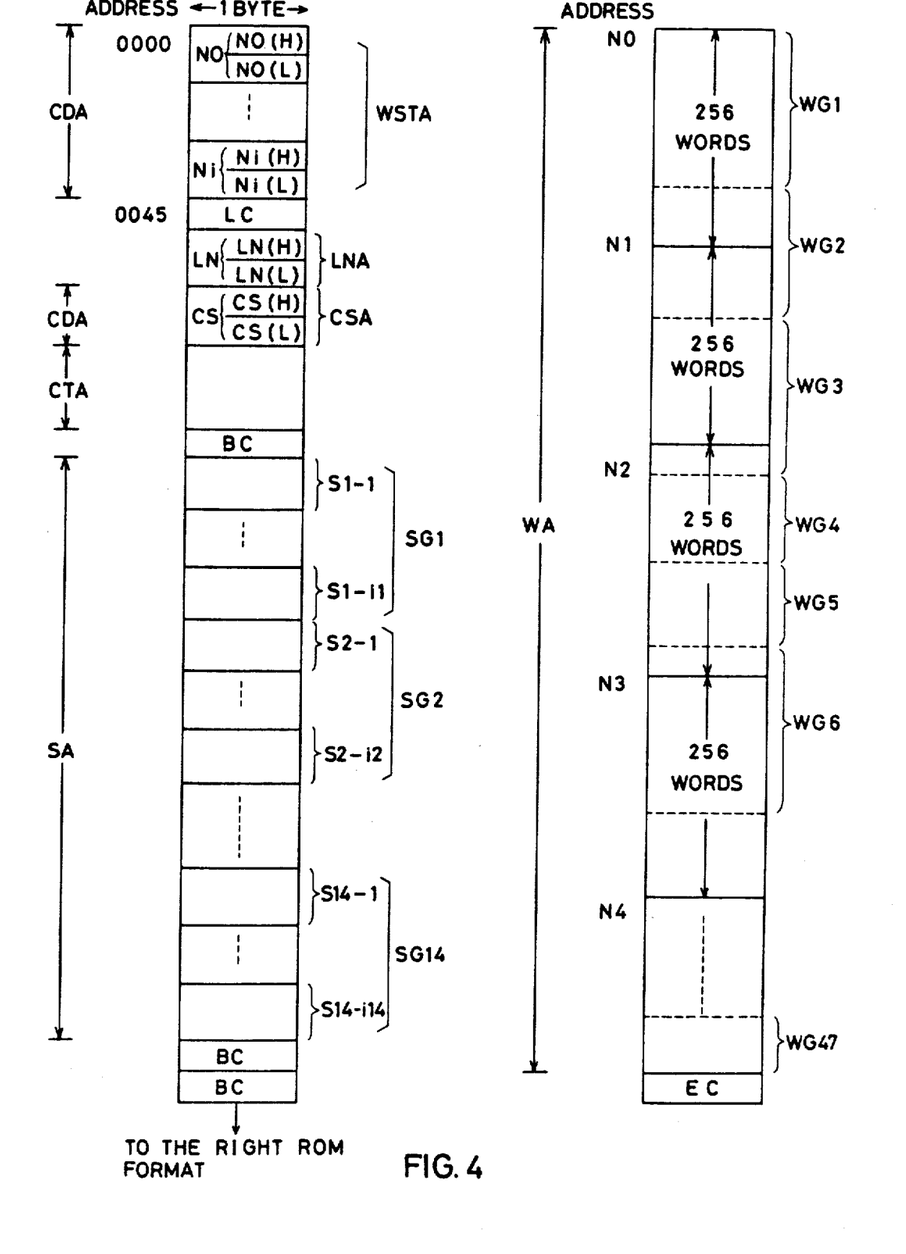
FIG. 4 shows a format of a ROM for memorizing words, the ROM being connected in the circuit of FIG. 2.

FIG. 4 shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect some English spelling letter combinations having a high frequency in occurrence. The thus selected English spelling letter combinations are changed to corresponding compression codes for memorizing purposes. The data-compression table CTA stores data for presenting correspondence between the selected spelling and the compression codes.

When correspondence between an input words and one or more words memorized in one of the ROMs is to be detected, the input word is changed to words inclusive of one of the compression codes according to the contents of the data-compression table CTA since each of the ROMs stores codes which may include one of the compression codes. The table CTA is used to display words stored in one of the ROMs by changing the codes stored therein to their original spelling. The details of this table are different depending on the kind of language to make the degree of data compression the greatest.

Stored words are classified as 47 categories in each of which a number of words are ordered. In FIG. 4, a word category n is referred to WGn. Sentences are formed by a combination of a plurality of stored words. These sentences are classified in 14 categories, in each of which a number of sentences are ordered. In FIG. 4, a sentence category m is referred to SGm containing a first sentence $S_{M-1}$ to a last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "c" | airplane |

TABLE 1-1-continued

| The serial number of the category | corresponding key | the name of the category |
|---|---|---|
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O"or "." | at medical practitioner's Office |
| 14 | "SPC" or "o" | emergency |

Each category for the words contains 256 words. A first word address table region WSTA contains a first address referred to $N_0, N_1, N_2, \ldots N_4$ in FIG. 4. This first address is related to a location in which first codes or first compressed code for representing the first word is stored. In accordance with a specific example of the present invention, each address is represented with two bytes. Each first address is separated into an upper byte referred to No(H) to Ni(H) and a lower byte referred to No(L) to Ni(L). The first word address table region is used to shorten retrieval time for a specific word.

CS is referred to as a first sentence address CS(H) and CS(L) which is stored in a first sentence address region CSA. LNA indicates a memory location for storing a serial number of a word indicating the kind of a specific tongue as referred to LN of LN(H) and LN(L). More particularly, as the ROM storing English words is concerned, a word "English" in necessarily contained in that ROM. In such a case, the serial number of the words "English" in the ROM is LN starting from the first word of the same kind of word group.

Memorizing the serial number LN is suitable for showing the kind of the mother tongue and the foreign tongue being selected in the character indicator 3 because it is unnecessary to additionally memorize a word showing the kind of tongue.

The translator of the present invention may comprise audible sound generating means for audibly developing words represented in the mother tongue and/or the foreign tongue. Since such an audible sound generating means is disclosed in, for example, Hyatt U.S. Pat. No. 4,060,848 issued Nov. 29, 1979, further description is omitted.

In FIG. 4, LC indicates a tongue code in which an upper 4 bits indicate the field of the language stored in the ROM and lower 4 bits the kind of language stored in the ROM. In particular, there may be present a ROM for storing words oriented to economy, engineering or medicine, respectively. Information representing such a field is stored in LC. The lower 4 bits corresponds to each kind of tongue as follows:

TABLE 1-2

| The lower 4 bits | the kind of language |
|---|---|
| 0001 (1) | English |
| 0010 (2) | German |
| 0011 (3) | Japanese |
| 0100 (4) | French |
| 0101 (5) | Spanish |
| 0110 (6) | another tongue |

TABLE 1-2-continued

| The lower 4 bits | the kind of language |
|---|---|
| 0111 (7) | a further tongue |

In FIG. 4, BC, "11111111" is a boundary code and EC "11111111" is an end code of the ROM.

Figure 5:
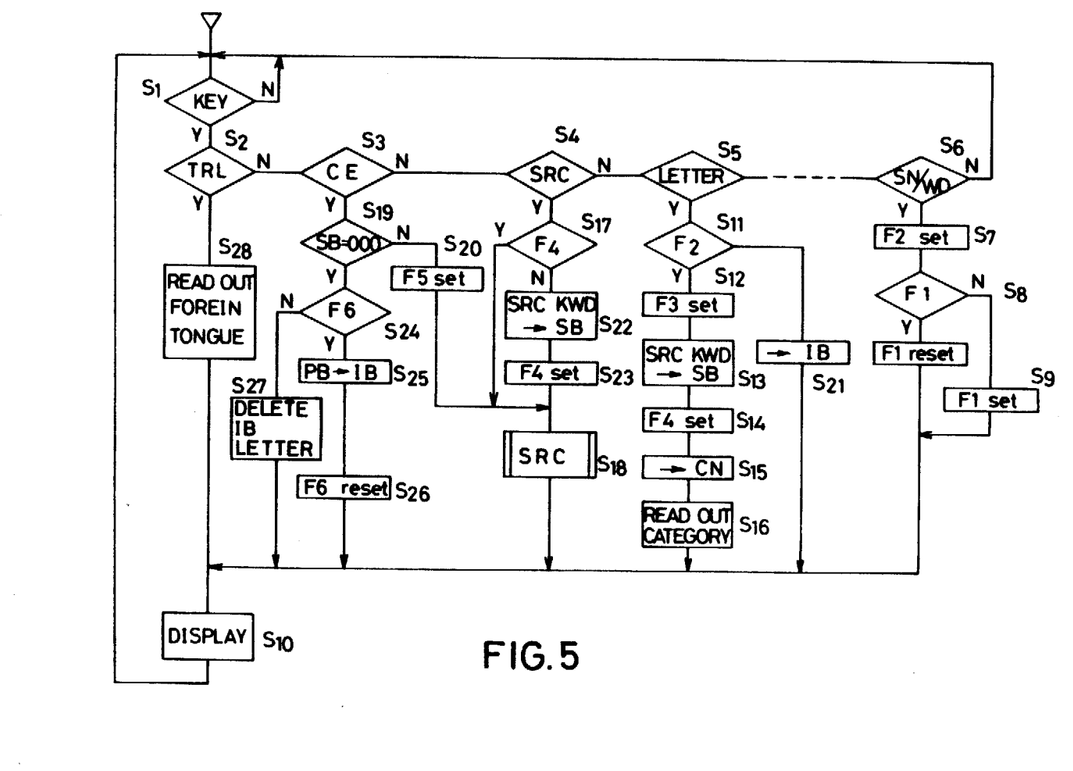
FIGS. 5 and 6(a) through 6(e) show flow charts of operation of this translator according to the present invention.

FIG. 5 shows a flow chart for representing operation of the electronic translator according to the present invention.

Prior to description of the operation, various operations of key inputting, flag, buffering, and searching will be described with reference to FIG. 1.

A "SN/WD" key 29 is actuated for accessing a sentence or a word in a selected category. While this key is actuated once to place the translator in a mode for outputting some sentence, one of the category keys $L_1$ to $L_{14}$ in FIG. 1 is actuated so that a first sentence in a selected category is addressed and displayed. While this key is actuated twice to place the translator in another mode for outputting some word, one of these category keys is actuated so that a first word in a selected category is addressed and displayed.

A "CE" key is actuated to retrieve words and sentences stored in a memory in a backward direction, say, from the end to the beginning. Further, it can be actuated to correct a letter entered and to delete the letter if any word or sentence containing such a letter is absent even after a searching operation for searching for any word or sentence containing the letter is conducted. This deleting operation is effected, for example, from the end of the word, letter by letter.

A "LNG" key 31 is actuated for selecting a mother tongue and a foreign tongue among languages. A " " key 32 is actuated to provide conversion of selection of a mother tongue and a foreign tongue. They are not directly related to the operation of the present invention.

A "SRC" key 33 is actuated to search a word or a sentence. A "TRL" key 34 is actuated to translate a sentence or a word. A "SHT" key 35 is actuated to select inputting by alphabetical letters when Japanese is selected to be a mother tongue or a foreign tongue.

Many flags $F_1$ to $F_6$ are provided for memorizing the respective conditions. They are provided within part of the data RAM 21 in FIG. 3. Setting or resetting them indicates the following meanings as illustrated in Table 2.

TABLE 2

| Flag | Set | Reset |
|---|---|---|
| $F_1$ | indicates a sentence-outputting mode | indicates a word-outputting mode |
| $F_2$ | indicates a category-searching mode | indicates no category-searching mode |
| $F_3$ | indicates that a letter key such as a "Katakana" or an alphabetical letter is inputted | indicates that any letter key except for the key is inputted |
| $F_4$ | indicates that a code for representing the kind of a search mode is inputted into a buffer SB | indicates that any code for representing the kind of a search mode is not entered into the buffer SB |
| $F_5$ | indicates SB = 000, that a code for presenting the kind of a search mode in which all the $F_1$,$F_2$ and $F_3$ are reset is inputted into the buffer SB (during | indicates SB ≠ 000 (except for a case during a mode for searching spelling |

TABLE 2-continued

| Flag | Set | Reset |
|---|---|---|
| | a mode for searching spelling) | |
| $F_6$ | indicates that any corresponding information is found during the mode for searching spelling | indicates that no corresponding information is found during the mode for searching spelling |

The buffer SB is provided at part of data RAM 21. The following kinds of search may be inputted into the buffer SB to produce five search modes as shown in Table 3 and as referred to steps $S_{13}$ and $S_{22}$ in FIG. 5.

Search steps $S_{18}$ is selected to conduct routines of FIGS. 6(a) to 6(e).

Figure 6:
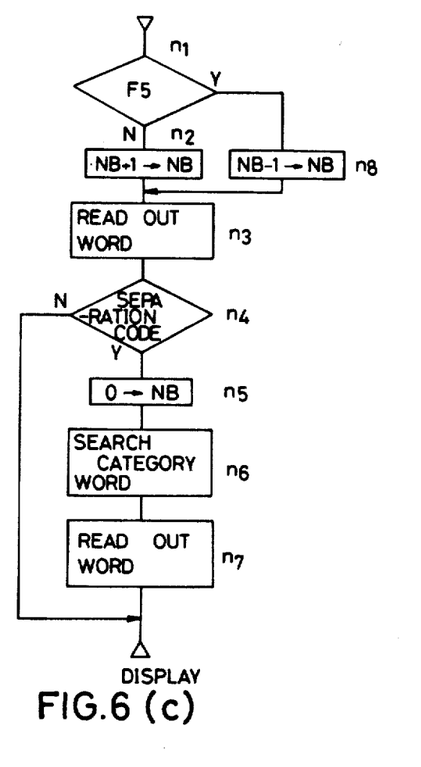
Figure 6A:
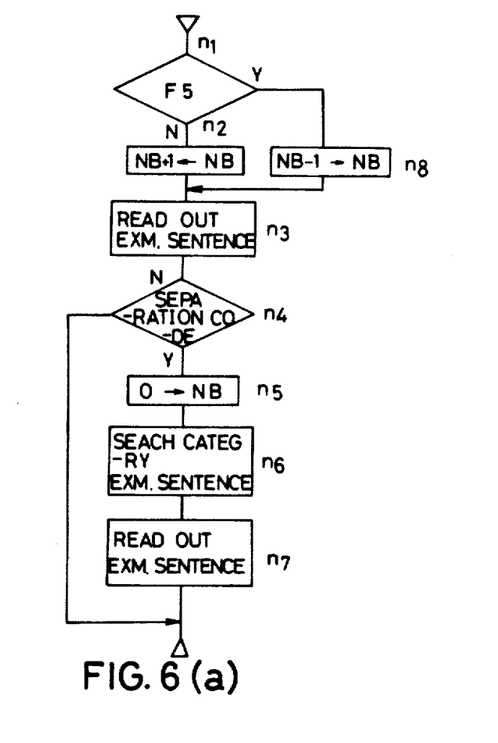
Figure 6B:
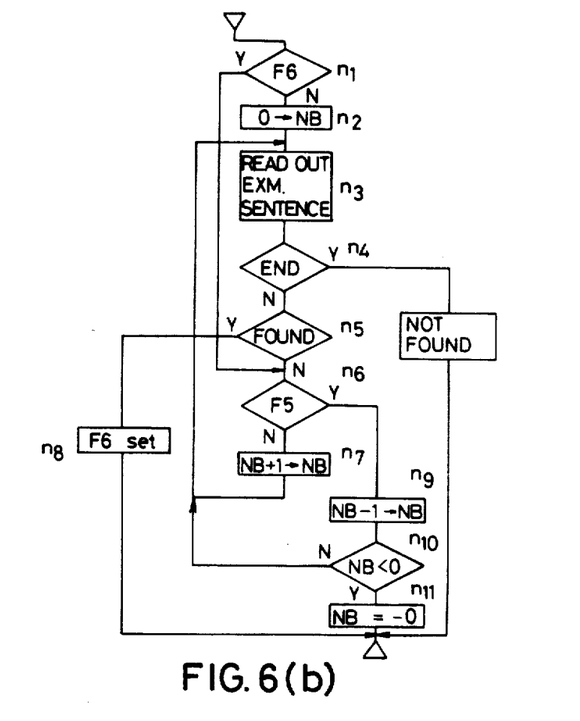
Figure 6D:
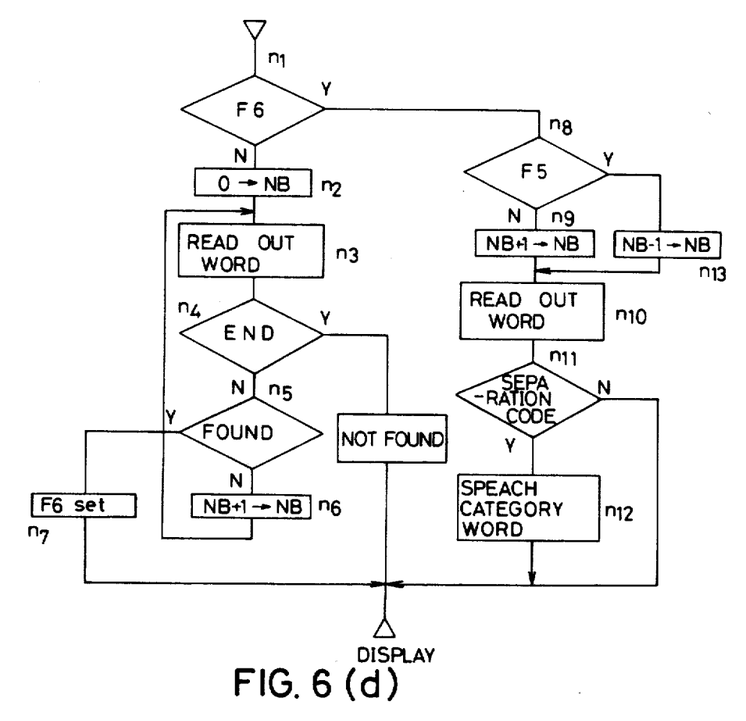

| | kind of search mode | $F_1$ | $F_2$ | $F_3$ |
|---|---|---|---|---|
| FIG. 6(a) | a mode for searching a sentence in a category | 1 | 1 | 1 |
| FIG. 6(b) | a mode for searching a sentence with a key word | 1 | 1 | 0 |
| FIG. 6(c) | a mode for searching a word in a category | 0 | 1 | 1 |
| FIG. 6(d) | a mode for searching a word with a key word | 0 | 1 | 0 |
| FIG. 6(e) | a mode for searching spelling | 0 | 0 | 0 |

In Table 3, "1" represents a set condition and "0" indicates a reset condition. In the flow chart of FIG. 5, "IB" and "PB" each indicate a buffer memory for memorizing letter information inputted by the keyboard. Both memories are within the data RAM 21 of FIG. 3. The search routine $S_{18}$ of FIG. 5 is executed to follow one of the flow charts of FIGS. 6(a) to 6(e), depending on the conditions of the flags $F_1$ to $F_3$.

Now, the respective search modes are described with reference to the flow charts of FIGS. 5 and 6(a) to 6(e).

(A) searching a sentence in a category as indicated in FIGS. 5 and 6(a):

This mode is characterized by retrieving sentences in a category in a forward or a backward direction. In FIG. 5, the "SN/WD" key 29 is actuated and, in response to the detection in step $S_6$ as the actuation of this key, the flag $F_2$ for representing the category search mode is set in step $S_7$. In an initial condition, a sentence search mode is not selected to reset the flag $F_1$ in step $S_8$. Then, the flag $F_1$ is set to select a sentence search mode in step $S_9$.

A desired one of the category keys $L_1$ to $L_{14}$ is actuated in step $S_5$. In this category search mode, the flag $F_2$ is set in step $S_{11}$. Thereafter, any letter key but one category key in this instance is inputted to set the flag $F_3$ in step $S_{12}$. Since now the flags $F_1$ to $F_3$ are all set, it is detected that a mode specified by $F_1$ $F_2$ $F_3$=111 in Table 3 for searching a sentence is selected. A code for representing the kind of searching is entered into the buffer SB in step $S_{13}$.

The flag $F_4$ is set in step $S_{14}$ to represent that a code is entered into the buffer SB, the code indicating the kind of searching to be performed. A code corresponding to the selected category is inputted into the buffer CN in step $S_{15}$. Step $S_{16}$ is performed to access a leading sentence in the category from the memory. Step $S_{10}$ is executed to display the leading sentence.

The "SRC" key 33 is actuated so that actuation of this key is detected in step $S_4$. A second sentence is addressed from the memory and displayed. In this case, the flag $F_4$ is set in step $S_{17}$ so that a search routine $S_{18}$ is selected. In the step $S_{18}$, the sentence search mode is selected because flags $F_1$ to $F_3$ are set. Therefore, the flow charts of FIG. 6(a) follows. In the step $S_{18}$, the search operation depends on the kind of searching.

With reference to FIG. 6(a), in an initial condition, the flag $F_5$ is reset in step $n_1$. The contents of the buffer NB for storing serial numbers of sentences are counted up in step $n_2$. In step $n_3$, a specific sentence corresponding to a particular serial number is addressed. Step $n_4$ is selected to detect whether the outputted contents are a category separation code or not. When it is not category separation code, the routine of step $S_{18}$ ends. In the following time, the "SRC" key 33 is repeatedly actuated to subsequently address and display sentences in the same category.

When the category separation code inserted between two categories is detected in step $n_4$ of FIG. 6(a), step $n_5$ is selected to set a serial number of a sentence to be "0". Then, a leading sentence of a category defined by the contents of the buffer CN is addressed and displayed in steps $n_6$ and $n_7$. The buffer CN is provided for storing a code corresponding to a selected category.

During this routine, the "CE" key 30 can be actuated to enable backward retrieval. Step $S_3$ is selected to detect that this key is actuated. In step $S_{19}$, it is detected that the buffer SB does not contain "000" because the flags $F_1$ to $F_3$ have not been reset. In $S_{20}$, the flag $F_5$ is set to lead to the search routine $S_{18}$.

In the search routine $S_{18}$, the flow chart of FIG. 6(a) is described as follows. The flag $F_5$ is set to count down a serial number in the buffer NB in $n_8$. A sentence corresponding to a count down serial number is addressed in $n_3$.

Thus, the "CE" key 30 is actuated to address a sentence prior to a sentence now displayed. When this key is repeatedly operated, the address is decremented to facilitate examination of a prior sentence each time this key is operated to facilitate backward retrieval.

Even after a leading sentence is addressed in the backward retrieval, the key 30 is further actuated to detect the category separation code in $n_4$ so that the leading sentence is addressed again.

(B) searching a sentence with a key word as indicated in FIGS. 5 and 6(b):

This mode is characterized by retrieving sentences containing a key word which is entered via the keyboard of FIG. 1. For example, a key word of "HOW" can be inputted to address all the sentences starting with this key word.

This mode is selected by the following key operations:
 (i) inputting a key word;
 (ii) actuating the "SN/WD" key 29; and
 (iii) actuating the "SRC" key 33

With reference to FIG. 5, the keyword is inputted by actuating the alphabetical keys of FIG. 1 in $S_5$. In an initial condition, the flag $F_2$ is reset in $S_{11}$, because of not selecting the category serach mode. The key word inputted is entered into the buffer IB in $S_{21}$.

The "SN/WD" key 29 is actuated to set the flag $F_2$ for representing selection of the category search mode. The flag $F_1$ is set to indicate selection of the sentence address mode as seen in $S_6 \rightarrow S_7 \rightarrow S_8 \rightarrow S_9$. The "SRC" key 33 is actuated to select $S_{17} \rightarrow S_{22}$ since the flag $F_4$, for indicating that a code for showing the kind of searching is entered into the buffer S, is not set. A code for representing the kind of searching, say, the mode for searching a sentence with the keyword is entered into the buffer SB. The flag $F_4$ is set in $S_{22} \rightarrow S_{23}$ to conduct the search routine $S_{18}$.

When the flags $F_1$ to $F_3$ are placed to be "110" in Table 3, the flow chart of FIG. 6(b) is selected. In the flow chart of FIG. 6(b), the flag $F_6$ is provided for indicating whether any word or sentence containing the entered letters is present or not. This is called a mode for searching spelling.

In an initial condition, the flag $F_6$ is reset to select $n_1 \rightarrow n_2$. In $n_2$, the contents of the buffer NB are set to be "0".

In $n_3$, sentences from a leading one are addressed from the memory. When the outputted data is not the END code, it is detected whether the outputted sentence contains the key word or not. If it is detected in $n_5$ that such a sentence is not found, the serial number in the buffer NB is counted up since the flag $F_5$ is placed in a reset condition because of $SB \neq 000$. This is done in $n_6 \rightarrow n_7 \rightarrow n_3$. If a corresponding sentence is addressed in $n_5$, the flag $F_6$ is set in $n_8$ so that the routine $S_{18}$ of FIG. 5 ends.

When the "SRC" key 33 is actuated again in $S_4$, the routine $S_{18}$ is selected since the flag $F_4$ is set in $S_{17}$. The flow chart of FIG. 6(b) is executed. In such a case, since the flag $F_6$ has been set in $n_1$, step $n_6$ is selected. Step $n_7$ is selected because the flag $F_5$ is reset on account of $SB \neq 000$. The serial number in the buffer NB continues to be improved to enable a new search in $n_7$.

Thus, a succession of sentences each containing the key inputted are displayed subsequently. When the "CE" key 30 is actuated during the operation, $S_3 \rightarrow S_{19} \rightarrow S_{20}$ are selected. $S_{19}$ is executed to determine whether the buffer SB contains "000" or not. By setting the flag $F_5$ to thereby memorize whether any sentence containing the key word inputted is present or absent, the searching routine is performed.

In the flow charts of FIG. 6(b), $n_6$ is selected to set the flag $F_5$ so that $n_9$ is executed. While the contents of the buffer NB are counted down to address the sentences in reverse order, any sentence to be sought is detected as referred to in $n_1 \rightarrow n_6 \rightarrow n_9 \rightarrow n_{10} \rightarrow n_3$. When the "CE" key 30 is repeatedly actuated, a decrementing of the address to facilitate a backward retrieval of sentences is enabled each time this key is operated.

If the contents of the buffer NB become smaller than "0", which can be detected in $n_{10}$, the "CE" key 30 is no longer available so that no sentence can be outputted. Needless to say, a forward retrieval of sentences can be enabled by actuating the "SRC" key 33.

(C) searching a word grouped in a category as indicated in FIGS. 5 and 6(c):

This mode is specified by allowing one or more words to develop from a categorized memory. The "SN/WD" key 29 is actuated twice (or an even number of times), this mode can therefore be selected where one of the category keys $L_1$ to $L_{14}$ is activated to access a first sentence in a category.

With reference to FIG. 5, the "SN/WD" key 29 is actuated to set the flag $F_2$ and then the flag $F_1$ as referred to in $S_6 \rightarrow S_7 \rightarrow S_8 \rightarrow S_9$. Secondarily, this key 29 is actuated in $S_8$ to reset the flag $F_1$ since the flag $F_1$ is set, so that the category word searching mode is selected because of the reset $F_1$ and the set $F_2$. A desired one of the category keys $L_1$ to $L_{14}$ is selected in $S_5$. Since the flag $F_2$ is set in $S_{11}$, the flag $F_3$ is set in $S_{12}$ so that the code of $F_1$ $F_2$ $F_3=011$ is applied into the buffer SB together with setting the flag $F_4$.

Therefore, a code corresponding to a selected category is entered into the buffer CN where a leading word in the category is accessed from the memory and displayed as shown in $S_{13}\rightarrow S_{14}\rightarrow S_{15}\rightarrow S_{16}$. By actuating the "SRC" key 33 in $S_4$, the search routine $S_{18}$ is selected on account of the set flag $F_4$ in $S_{17}$. Since each of the flags $F_1$, $F_2$ and $F_3$ is reset, set and set, the flow chart of FIG. 6(c) follows.

In the flow chart of FIG. 6(c), on account of "SB$\neq$000", the contents of the buffer NB for storing a serial number of a word are counted up so that a word corresponding to the serial number is accessed in $n_2$ and $n_3$. The access system is identical with that of FIG. 6(a) except that a word is accessed in place of a sentence, from the memory. Any further description is omitted.

The "SRC" key 33 is actuated to provide forward retrieval of any word in a category while the "CE" key 30 is actuated to provide backward retrieval of any word in the same category.

(D) Searching a word with a key word as indicated in FIGS. 5 and 6(d):

This mode is specified by accessing any word with a key word inputted, the word belonging to a category to which the key word also belongs. Examples of this mode are shown in Table 4.

TABLE 4

| Key Input | Display |
|---|---|
| ZOO | ZOO |
| "SN/WD" | ZOO |
| "SN/WD" | ZOO |
| "SRC" | ZOO |
| "SRC" | LION |
| "SRC" | TIGER |
| "TRL" | Japanese corresponding to "TIGER" |
| "SRC" | BEAR |

This mode is performed by the following key input operation:

(i) inputting a key word by actuating the keyboard;
(ii) actuating the "SN/WD" key 29 twice (or an even number of times); and
(iii) actuating the "SRC" key 33.

With reference to FIG. 5, $S_5$ is executed by inputting the key word so that $S_{21}$ is selected to enter the word into the buffer IB since the flag $F_2$ is reset in an initial condition in $S_{11}$. By actuating the "SN/WD" key 29 twice, the flag $F_1$ is reset, the flag $F_2$ is set and the flag $F_3$ is reset. The "SRC" key 33 is actuated in $S_4$, so that the code of "$F_1F_2F_3=010$" is applied into the buffer SB in $S_{22}$ on account of the reset $F_4$. The flag $F_4$ is set in $S_{23}$ to represent that the code is applied into the buffer SB. The search routine $S_{18}$ follows.

In this case, the flow chart of FIG. 6(d) follows because of "$F_1F_2F_3=010$". In FIG. 6(d), in an initial condition, the flag $F_6$ is reset so that a leading word is accessed in $n_1\rightarrow n_2\rightarrow n_3$. When the END code is detected in $n_4$ and any word corresponding to the selected word is not found in $n_5$, a serial number in the buffer NB is counted up in $n_6$. This operation is repeated, until a corresponding word is found, in $n_6\rightarrow n_3\rightarrow\ldots$ In $n_5$, a corresponding word is found so that the flag $F_6$ is set in $n_7$ to show that a word corresponding to the entered key word is found. The routine $S_{18}$ terminates.

In $S_4$, the "SRC" key 33 is actuated, so that the search routine of FIG. 6(d) is selected because the flag $F_4$ is set in $S_{17}$. In $n_1$, the flag $F_6$ is set to select $n_8$. Since the flag $F_5$ is not set on account of "SB$\neq$000", the serial number in the buffer NB is counted up in $n_9$ to access a next serial number in turn in $n_{10}$. Thus, some words in the same category are accessed in turn. If a category separation code is outputted in $n_{11}$, a leading word in the category is retrieved in $n_{12}$.

In $S_3$ of FIG. 5, the "CE" key 30 is actuated to provide backward retrieval of words. The flag $F_5$ is set to conduct the search routine. In $n_8$ in the flow chart of FIG. 6(d), the serial number in the buffer NB is counted down in $n_{13}$. In $n_{10}$, a word just prior to the old word is accessed. When the category separation code is detected in $n_{11}$, a leading word in the same category is again accessed in $n_{12}$.

A final example is that the "CE" key 30 can be used as a key for correcting entered letters and for deleting the letters when any word or sentence containing the entered letters is not found even after searching spelling, as described below.

(E) Searching spelling as indicated in FIGS. 5 and 6(e):

This mode is specified by allowing all the words containing entered letters to develop at random. For example, if the entered letters comprise four or more letters, the letters more than four are omitted and any words containing the four letters are accessed, firstly. This operation is enabled by the following key input operation.

(i) key inputting letters to be searched; and
(ii) actuating the "SRC" key 33

In the flow chart of FIG. 5, because the "SN/WD" key 29 is not actuated, each of the flags $F_1$ and $F_3$ is reset. In $S_5$, the spelling of any desired letters is entered. The entered spelling is transferred into the buffer IB in $S_{21}$. In $S_4$, the "SRC" key 33 is actuated. A code of "$F_1F_2F_3=000$" is applied into the buffer SN in $S_{22}$ since the flag $F_4$ is not set in $S_{17}$. The flag $F_4$ is set to conduct the search routine $S_{18}$.

Since each of the flags $F_1$ to $F_3$ is reset, the flow chart of FIG. 6(e) follows. In this flow chart, in an initial condition, the flag $F_6$ is reset in $n_1$, so that the spelling inputted into the buffer IB is transferred into the buffer PB in $n_2$. In $n_3$, "0" is entered into the buffer NB for storing a serial number of a word. In $n_4$, a leading word is accessed so that spellings of these words are subjected to examination of correspondence with the entered word.

When the "END" code is not detected in $n_5$ and no spelling corresponding to that inputted is detected in $n_6$, the serial number is counted up in $n_7$ so that a next word is accessed in $n_4$. In $n_6$, when a corresponding word is detected in $n_6$, the flag $F_6$ is turned set in $n_8$ where, according to operation of the "SRC" key 33, corresponding words are in turn accessed and displayed.

During this mode, the "CE" key 30 is actuated so that this actuation is detected in $S_3$ of FIG. 5. Since the buffer SB stores a code of "$F_1F_2F_3=000$", $S_{19}$ is selected to detect this condition. $S_{24}$ is executed to determine whether the flag $F_6$ is set. In $S_{25}$, the entered spelling is returned from the buffer PB to the buffer IB. In $S_{26}$, the flag $F_6$ is reset. The spelling is displayed in $S_{10}$.

In the flow chart of FIG. 6(e), when no word corresponding to spelling inputted is found, in $n_9$, "NOT FOUND" is determined so that the flag $F_6$ is not set. When the "CE" key 30 is actuated in $S_3$, $S_{24}$ is selected because of "SB=000" in $S_{19}$. As the flag $F_6$ is not set, any letters contained in the spelling inputted into the buffer IB can be deleted from the ending letter each time the "CE" key 30 is actuated. Thus, correction of spelling to be searched can be enabled.

When the entered word has more than four letters, the letters more than four are cut down to make a word of the four letters. Depending on the word, all the words having this word are addressed. If no word corresponding to this four-letter word is not found, the "CE" key 30 is actuated to prepare a new word of three letters by eliminating one letter. Then, the search operation is repeated according to the three letters.

In the flow chart of FIG. 5, any entered letters can be eliminated. The entered letters are entered into the buffer IB in $S_5 \rightarrow S_{11} \rightarrow S_{21}$. In $S_{27}$, the "CE" key 30 is actuated to delete the letters.

Thus, any desired word or sentence can be accessed from the memory. A "TRL" key 34 is actuated to access and display a corresponding word or sentence as indicated in $S_2 \rightarrow S_{28} \rightarrow S_{10}$.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator wherein a first word having a predetermined meaning in a first language is entered to obtained a sentence in said first language as well as a translation of said sentence in a second language including a translation word having the same predetermined meaning as said first word, comprising:

input means for entering said first word;

memory means for storing a plurality of words in said first language at locations therein, said words being arranged in source sentences, said memory means further storing translation words in said second language arranged in translation sentence, said translation words being stored in locations related to locations of first words, related sentences being stored in adjacent locations in memory;

access means for successively accessing locations in said memory means and for recalling a source sentence stored therein which includes the first word in said first language and for recalling a translation sentence containing the translation word coresponding in meaning to said first word; and means for controlling said access means to sequentially access locations in said memory means of said source or translation sentences in either a forward or a reverse direction, as desired so as to access related sentences stored in said memory means.

2. The translator of claim 1 wherein said access means comprises detection means for determining a coincidence between said first word entered therein and a word of a sentence in said first language stored at a location in said memory means and producing a detection signal in response thereto; and means for recalling a said translation sentence in said second language stored at said location in response to generation of said detection signal.

3. The translator of claim 1 further comprising display means responsive to said access means for displaying the sentence in said first language stored in said memory means at an accessed location.

4. The translator of claim 1 wherein said control means included means responsive to sequential accessing of all desired locations in memory by said accessing means for amending the first word introduced via said input means to delete at least one letter therefrom.

5. The translator of claim 1 wherein said control means includes input correction means for deleting said first word introduced by said input means.

* * * * *